(12) United States Patent
Krings et al.

(10) Patent No.: US 11,753,112 B2
(45) Date of Patent: Sep. 12, 2023

(54) BRAKING ASSEMBLY FOR A SNOWMOBILE

(71) Applicant: Polaris Industries Inc., Medina, MN (US)

(72) Inventors: Daniel K. Krings, Roseau, MN (US); Luke A. Guderjohn, Roseau, MN (US); Michael A. Hedlund, Roseau, MN (US); Jesse J. Laugen, Roseau, MN (US); Christopher D. Harwood, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 245 days.

(21) Appl. No.: 17/144,532

(22) Filed: Jan. 8, 2021

(65) Prior Publication Data

US 2021/0214044 A1 Jul. 15, 2021

Related U.S. Application Data

(60) Provisional application No. 62/959,463, filed on Jan. 10, 2020.

(51) Int. Cl.
*B62M 27/02* (2006.01)
*F16D 55/36* (2006.01)
*F16D 55/225* (2006.01)

(52) U.S. Cl.
CPC ........... *B62M 27/02* (2013.01); *F16D 55/225* (2013.01); *F16D 55/36* (2013.01)

(58) Field of Classification Search
CPC ........ B62M 27/02; B62D 55/07; B62D 55/08; B62L 1/005; F16D 55/36; F16D 55/225; F16D 2055/0033; F16D 55/10; F16D 55/18; F16D 13/646; F16D 65/123
USPC .......................................................... 188/26
See application file for complete search history.

(56) References Cited

U.S. PATENT DOCUMENTS

| | | | | |
|---|---|---|---|---|
| 10,247,255 | B2* | 4/2019 | Choi | B62L 1/02 |
| 10,816,047 | B2* | 10/2020 | Maruta | F16D 55/50 |
| 2008/0173492 | A1* | 7/2008 | Aitcin | B60K 17/06 |
| | | | | 29/700 |
| 2017/0341467 | A1* | 11/2017 | Seear | F16D 55/39 |
| 2018/0111662 | A1* | 4/2018 | Ball | B62L 1/00 |
| 2018/0251168 | A1* | 9/2018 | Mangum | B62D 55/07 |
| 2019/0118904 | A1* | 4/2019 | LeBlanc | B62M 27/02 |
| 2022/0227459 | A1* | 7/2022 | Kauppinen | B62J 43/10 |

* cited by examiner

*Primary Examiner* — Anne Marrie M Boehler
(74) *Attorney, Agent, or Firm* — Faegre Drinker Biddle & Reath LLP (57) ABSTRACT

A snowmobile includes a frame assembly having a tunnel, a powertrain assembly supported by the frame assembly, and a braking assembly positioned within the tunnel.

17 Claims, 6 Drawing Sheets

BRAKING ASSEMBLY FOR A SNOWMOBILE

CROSS-REFERENCE TO RELATED APPLICATION

The present application claims priority to U.S. Provisional Application No. 62/959,463, filed Jan. 10, 2020, the entire disclosure of which is incorporated herein by reference.

BACKGROUND OF THE DISCLOSURE

The present disclosure relates to snowmobiles and, more particularly, to the location of a braking assembly for snowmobiles.

Generally, snowmobiles are available for various applications such as deep snow, high performance, luxury touring, and trail riding. With respect to trail riding, the size (e.g., the width) of the snowmobile must be compatible with the width of the trails. As such, if various systems or components of the snowmobile are relocated to different portions of the snowmobile, the overall size of the snowmobile must be taken into account. Further, the relocation position of the system or component may have an impact on the center of gravity of the snowmobile and, therefore, also must be taken into account.

While the present application discloses the location of a braking assembly for a snowmobile, certain structural components are common to many snowmobiles. For example, snowmobiles typically include a frame, a track assembly, a powertrain assembly, skis, and at least one suspension system, as are illustrated in any of the following U.S. Pat. Nos. 7,353,898; 7,533,749; 7,694,768; 7,891,454; 7,854,285; 8,127,877; 8,490,731; 8,590,654; 8,944,204; 9,096,289; 9,428,232; and 9,446,810, the complete disclosures of which are expressly incorporated herein by reference.

SUMMARY OF THE DISCLOSURE

In one embodiment, a snowmobile comprises a frame assembly having a tunnel, a powertrain assembly supported by the frame assembly, and a braking assembly positioned within the tunnel.

In another embodiment, a snowmobile comprises a frame assembly having a tunnel defined by a first side wall, a second side wall, and a support platform coupled to the first and second side walls. The snowmobile also comprises a powertrain assembly supported by the frame assembly. At least a portion of the powertrain assembly is positioned inwardly of the first and side walls. The snowmobile further comprises a braking assembly operably coupled to the portion of the powertrain assembly and positioned inwardly of the first and second side walls.

In another embodiment, a snowmobile comprises a frame assembly having a tunnel defined by a first side wall, a second side wall, and a support platform coupled to the first and second side walls. The snowmobile also comprises a powertrain assembly supported by the frame assembly and comprising at least a drive shaft extending between the first and second side walls. Additionally, the snowmobile comprises a braking assembly coupled to the drive shaft and to an inner surface of one of the first and second side walls.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. For example, while the following description refers primarily to a snowmobile, it should be understood that the principles of the invention apply equally to other snow vehicles. While the present invention primarily involves a snowmobile, it should be understood, however, that the invention may have application to other types of vehicles, such as motorcycles, ATVs, utility vehicles, scooters, and mopeds.

Figure 1:
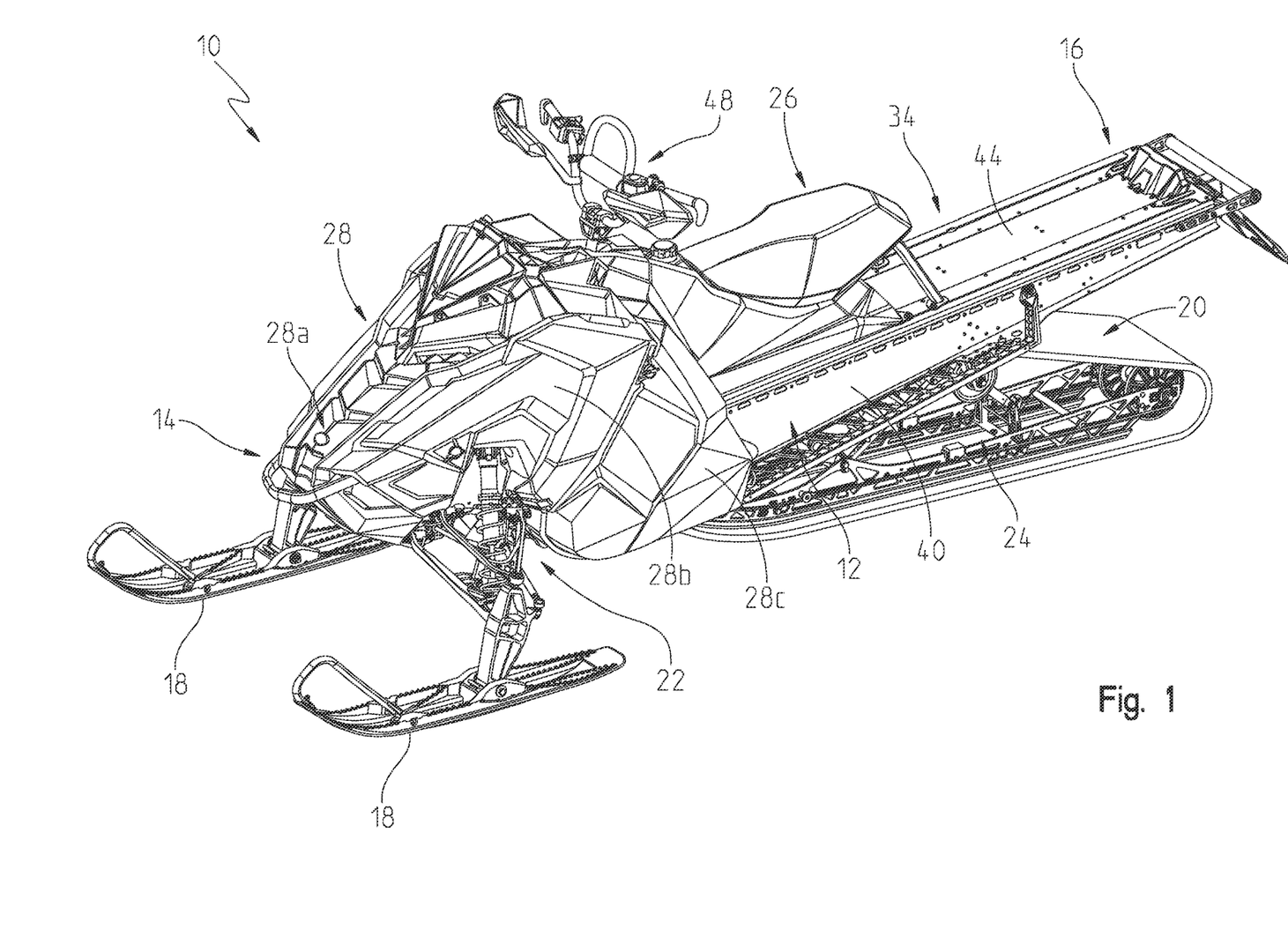
FIG. 1 is a front left perspective view of an illustrative snowmobile of the present disclosure.
Figure 2:
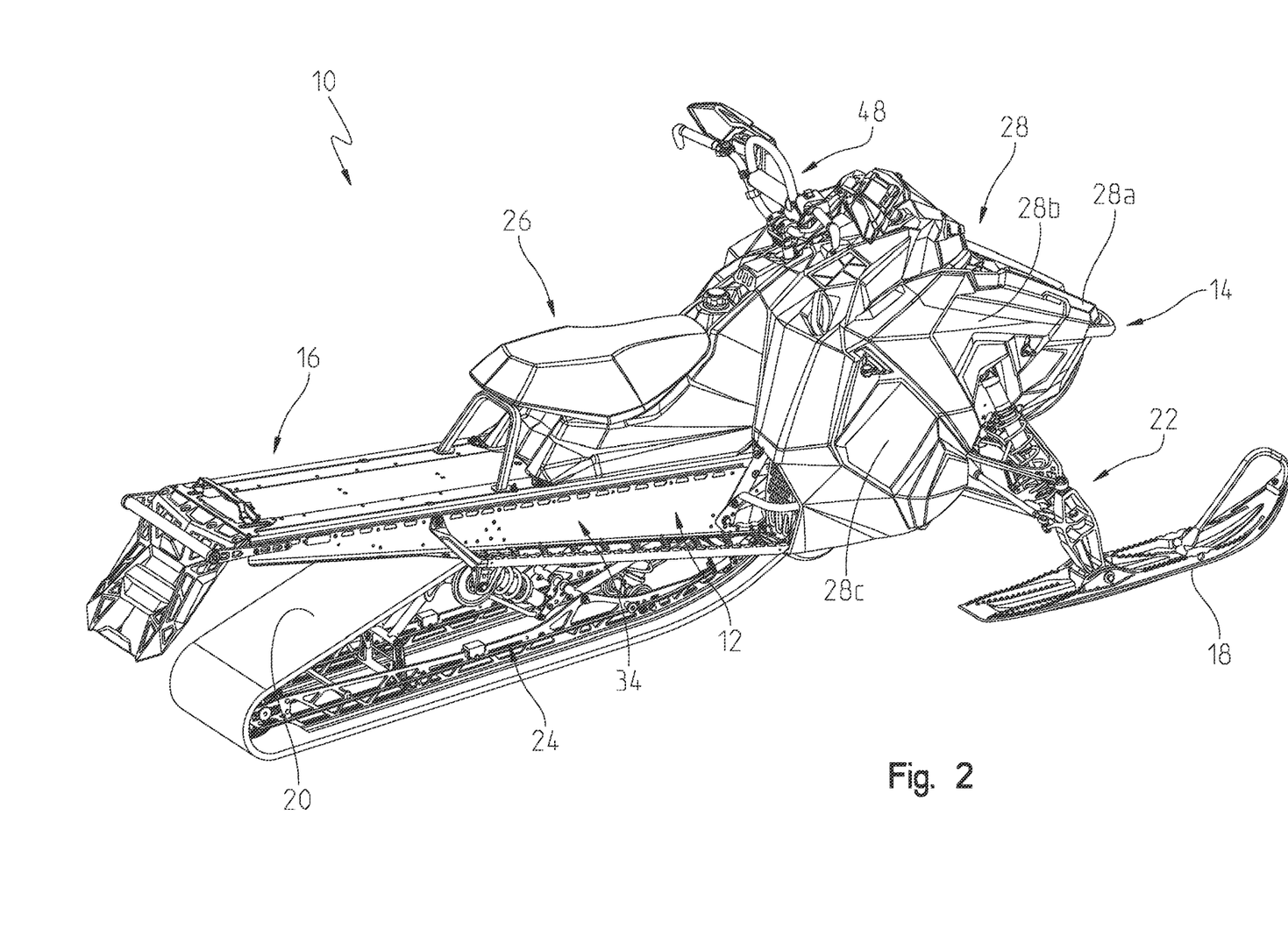
FIG. 2 is a rear right perspective view of the snowmobile of FIG. 1.

Referring to FIGS. 1 and 2, an illustrative embodiment of a snowmobile 10 includes a chassis or frame assembly 12 having a front frame portion 14 and a rear frame portion 16. Front frame portion 14 is supported by front ground-engaging members, illustratively skis 18, and rear frame portion 16 is supported by a rear ground-engaging member, illustratively an endless track 20. Front skis 18 are operably coupled to a front suspension assembly 22, and endless track 20 cooperates with a rear suspension assembly 24 during movement of snowmobile 10. Snowmobile 10 also includes a seat assembly 26 having a seating portion for at least a driver and an optional seating portion for a passenger positioned rearward of the driver portion. A cargo rack or frame may be positioned rearwardly of seat assembly 26 and coupled to rear frame portion 16.

Figure 4:
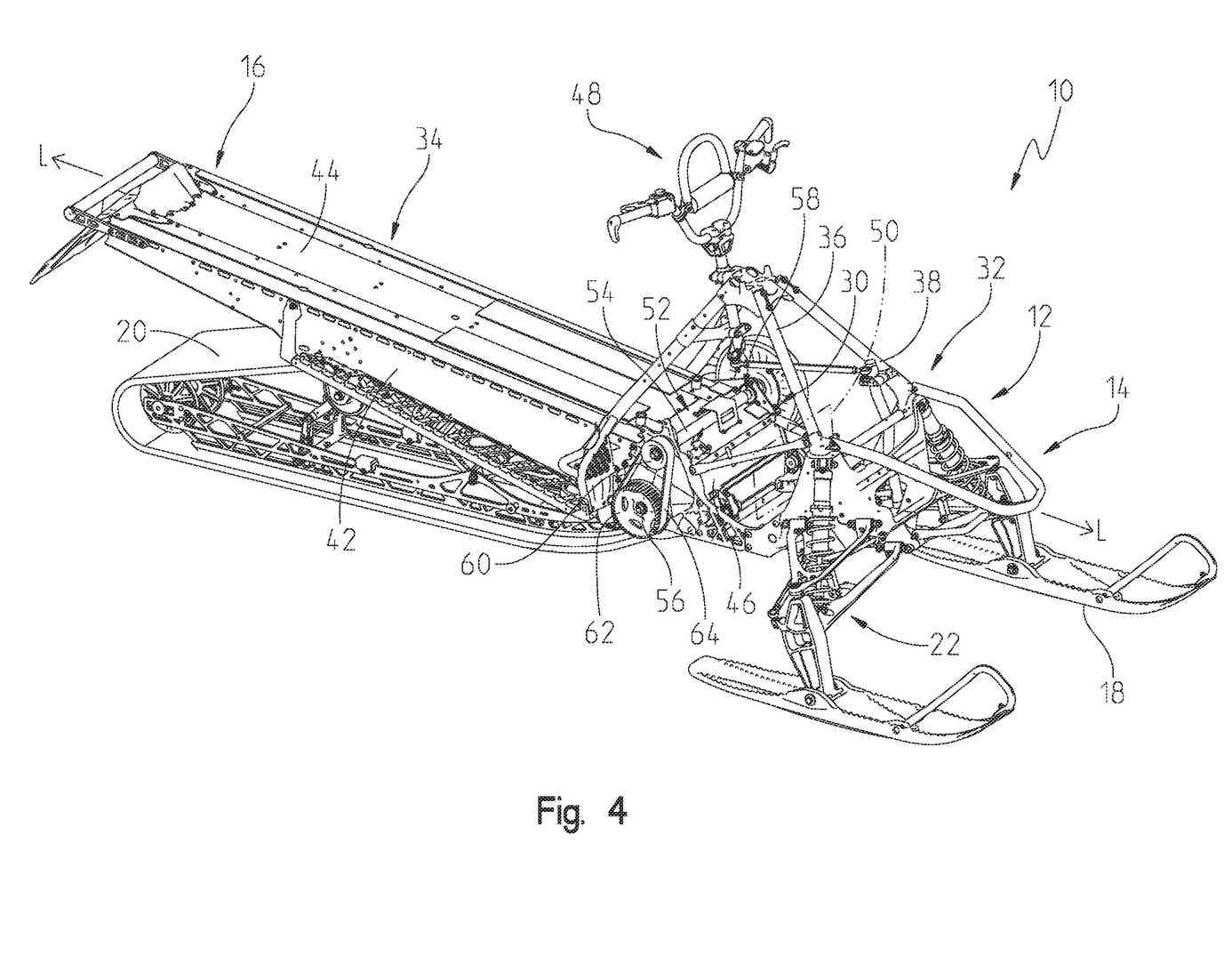
FIG. 4 is a front right perspective view of a braking assembly of the snowmobile of FIG. 1.

Referring still to FIGS. 1 and 2, snowmobile 10 further includes a body assembly 28 comprised of a plurality of body panels. Body assembly 28 conceals certain components or systems of snowmobile 10 such as portions of frame assembly 12, portions of front suspension assembly 22, and portions of a powertrain assembly 30 (FIG. 4). Body assembly 28 includes a nose 28a, front panels 28b, and side panels or fenders 28c.

Figure 3:
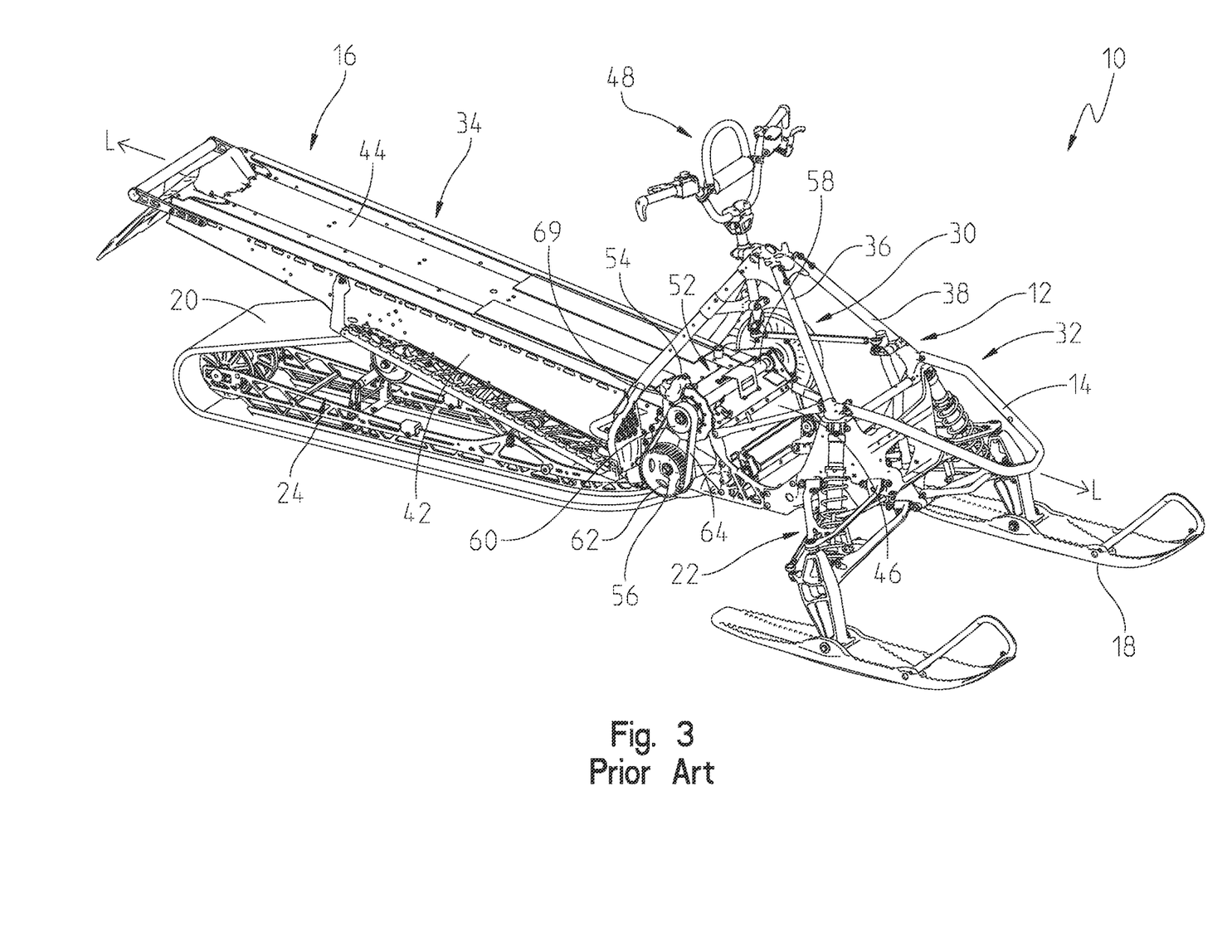
FIG. 3 is front right perspective view of a prior art braking assembly for a snowmobile.

Referring to FIGS. 3 and 4, frame assembly 12 includes a bulkhead 32 coupled to a tunnel 34 extending along a longitudinal axis L of snowmobile 10. Bulkhead 32 comprises a front casting having right and left castings 36 and 38. Castings 36, 38 support a steering assembly 48.

With reference still to FIGS. 3 and 4, tunnel 34 is shown coupled to bulkhead 32 and extends rearwardly therefrom. More particularly, frame assembly 12 includes a first side wall 40 having an inner surface 90, a second side wall 42 having an inner surface 92, a support platform or surface 44 extending between and coupled to first and second side walls 40, 42, and a front wall or surface 46 extending between and coupled to first and second side walls 40, 42 and support platform 44. Side walls 40 and 42, support platform 44, and front wall 46 define tunnel 34. Tunnel 34 includes an open volume configured to receive and accommodate track 20.

Referring still to FIGS. 3 and 4, powertrain assembly 30 provides power to endless track 20 to move snowmobile 10. Powertrain assembly 30 is supported by front frame portion 14 and includes an engine 50 and a transmission (not shown). The transmission has high low gears and reverse. In one embodiment, the transmission is positioned laterally outward of engine 50 and along a left side of snowmobile 10 and concealed generally by at least fender 28c on the left side of snowmobile 10.

As shown best on snowmobile 10 of FIG. 3, powertrain assembly 30 further comprises a drivetrain assembly 52 comprising a countershaft or jackshaft 54 and a track driveshaft 56. Jackshaft 54 is operably coupled with the transmission and, in embodiments using a continuously variable transmission ("CVT"), is operably coupled with the secondary or driven pulley.

Referring still to snowmobile 10 of FIG. 3, jackshaft 54 also is operably coupled to driveshaft 56 through a belt/chain drive assembly 58. Belt/chain drive assembly 58 includes a drive sprocket 60, a driven sprocket 62, and a belt or chain 64 rotatably entrained with drive and driven sprockets 60, 62. Driven sprocket 62 is coupled with driveshaft 56. In operation, the crankshaft (not shown) of engine 50 drives the transmission (e.g., a primary or drive pulley of a CVT), thereby causing the transmission to output power (e.g., rotation) to jackshaft 54. Jackshaft 54 then drives driveshaft 56 through belt/chain drive assembly 58. As a result, driveshaft 56 rotates within a portion of tunnel 34.

Driveshaft 56 includes a plurality of drive or track lugs 66 fixed to an outer surface or outer diameter 68 thereof which are configured to engage an inner surface of track 20. Illustratively, track lugs 66 include outer or idler lugs 66a and at least one inner or track driver lug 66b and are positioned on outer surface 68 of driveshaft 56. In this way, as jackshaft 54 drives driveshaft 56 (through belt/chain drive assembly 58), driveshaft 56 rotates and lugs 66 rotate with driveshaft 56, thereby causing track 20 to rotate and move snowmobile 10. In various embodiments, driveshaft 56 may be a splined shaft, a hex-shaft (e.g., a shaft having a hexagonal cross-section), a circular shaft (e.g., a shaft having a circular cross-section), or any other type of shaft having smooth surfaces, engagement surfaces, and any cross-sectional shape.

Snowmobile 10 includes a braking assembly 70, which may be a dry or wet brake assembly. As shown in FIG. 3, a prior art location 69 for the braking assembly positions at least one brake disc and/or rotor and corresponding caliper(s) on jackshaft 54. In this way, the prior art location 69 for the braking assembly is positioned outside of tunnel 34 and, more particularly, is positioned outside of side walls 40, 42 and above at least a portion of support platform 44. The prior art location 69 may contribute to a heightened center of gravity of snowmobile 10 and also may increase the width of snowmobile 10. Additionally, the prior art location 69 of the braking assembly may cause snowmobile 10 to lose braking power if belt/chain drive assembly 58 has a failure.

Figure 5:
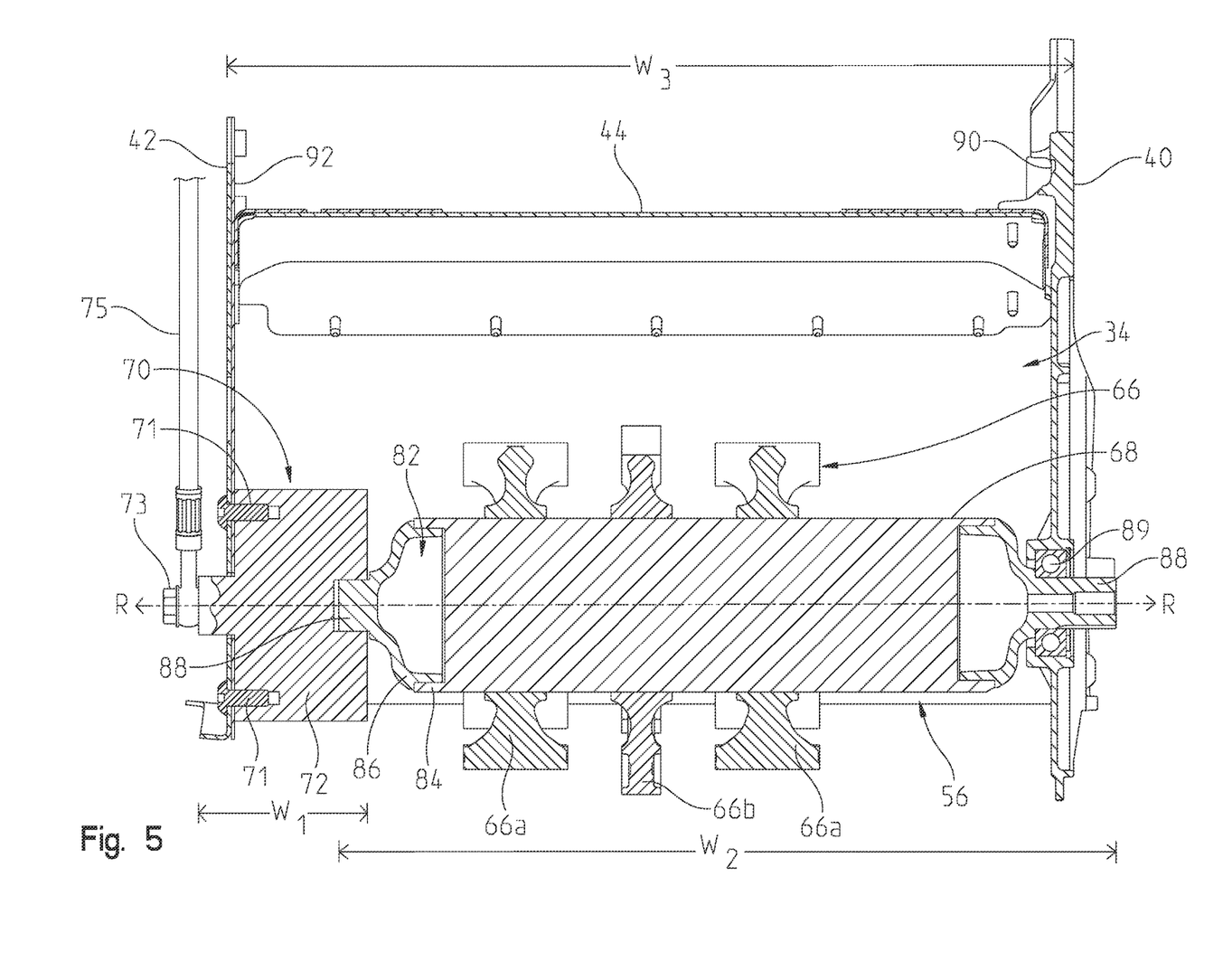
FIG. 5 is a cross-sectional view of a first embodiment of the braking assembly of FIG. 4 relative to a frame assembly and a powertrain assembly of the snowmobile of FIG. 1.
Figure 6:
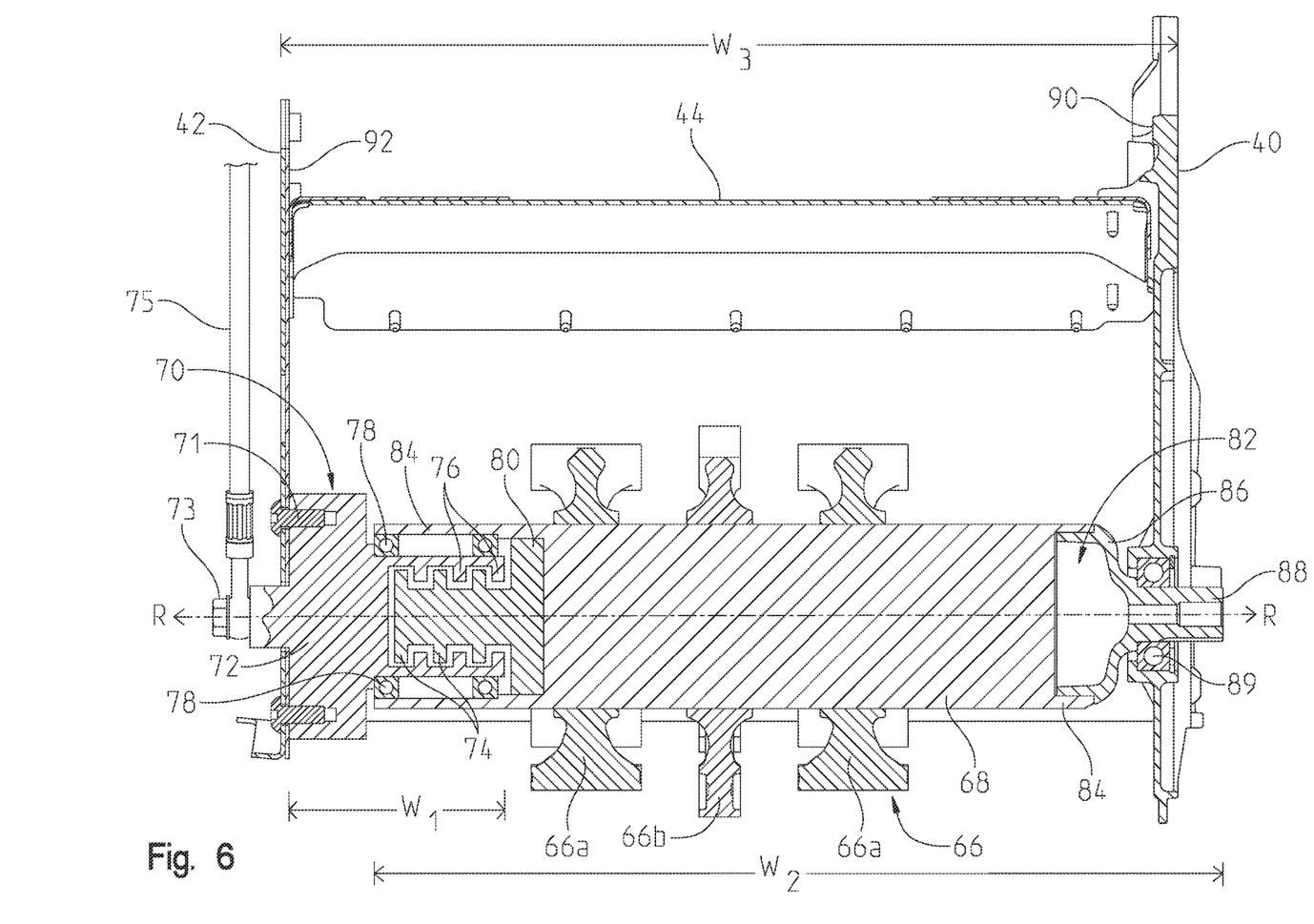
FIG. 6 is a cross-sectional view of a second embodiment of the braking assembly of FIG. 4 relative to the frame assembly and the powertrain assembly of the snowmobile of FIG. 1.

Referring to FIGS. 4-6, braking assembly 70 of the present application is shown. As shown in FIG. 4, braking assembly 70 is not positioned on jackshaft 54 and, illustratively, is not positioned outside of tunnel 34. More particularly, braking assembly 70 is not shown in FIG. 4 because braking assembly 70 is no longer positioned at location 69 (FIG. 3) and, instead, is positioned within tunnel 34. Illustratively, braking assembly 70 is positioned between inner surfaces 90, 92 of respective side walls 40, 42 and beneath a lower surface of support platform 44. As disclosed further herein, braking assembly 70 is positioned along either first side wall 40 or second side wall 42 and is generally laterally aligned with driveshaft 56.

Braking assembly 70 includes a shielding or guarding for various components. Illustratively, braking assembly includes a housing 72 configured to sealingly or non-sealingly support at least one brake disc or at least one brake rotor (shown at 74 in FIG. 6) and/or at least one corresponding brake caliper (shown at 76 in FIG. 6). While housing 72 is shown having various linear walls, housing 72 also may have any shape and is not limited to a closed shielding of such components; instead, housing 72 may be any type of plate, shield, guard, wall, or other such mechanism for shielding or guarding and at least partially concealing at least some of the brake disc(s), brake rotor(s), and/or the brake caliper(s) from other components, ice, snow, debris, etc.

Housing 72 may be coupled to one of side walls 40, 42 with removable, mechanical fasteners 71, such as bolts, screws, or the like. Alternatively, housing 72 may be permanently coupled to one of side walls 40, 42 with rivets, adhesive, welds, or the like. More particularly, housing 72 may be coupled to one of inner surfaces 90, 92 of the respective one of side walls 40, 42 such that housing 72 is positioned with tunnel 34 and is directly adjacent driveshaft 56. Braking assembly 70 also includes a brake fluid line (e.g., a hydraulic brake fluid line) 75 fluidly coupled to housing 72 with a fastener 73. In embodiments, brake fluid line 75 is positioned outside of tunnel 34 and, illustratively, is shown positioned on an outer surface of one of side walls 40, 42; however, in other embodiments, brake fluid line 75 may be positioned within tunnel and inward of side walls 40, 42.

Referring to the embodiment of FIG. 5, braking assembly 70 is positioned laterally intermediate one of inner surfaces 90, 92 of the respective one of side walls 40, 42 and a lateral end of driveshaft 56. More particularly, driveshaft 56 defines a generally linear body having two end caps 86 coupled thereto. End caps 86 are received within an open volume 82 at each lateral end of driveshaft 56 and may be coupled or adjacent to flanges 84. It is noted that driveshaft 56 may be a hollow body such that open volume 82 extends axially between the lateral ends. Each end cap 86 may include a nose 88 extending laterally outward. Illustratively, one end cap 86 is coupled to one of side walls 40, 42 such that nose 88 projects through one of side walls 40, 42 and rotates about rotational axis R relative to bearings 89 positioned at the side wall 40, 42. While the illustrative embodiment of driveshaft 56 shows end cap(s) 86 as separate from the cross-sectional body of driveshaft 56, end cap(s) 86 may be integral with the cross-sectional body of driveshaft 56.

Referring still to FIG. 5, the other/opposing end cap 86 includes nose 88 which is coupled to housing 72 of braking assembly 70. In one embodiment, nose 88 extends within a recess of housing 72, however, in other embodiments, driveshaft 56 is rotatably coupled to housing 72 through other coupling mechanisms. It is apparent from the illustrative embodiment of FIG. 5 that braking assembly 70 may be positioned within tunnel 34 but outward of driveshaft 56. According to the embodiment of FIG. 5, driveshaft 56 is rotatable about rotational axis R relative to housing 72, however, braking assembly 70 also may be configured such that at least a portion thereof is configured to rotate with driveshaft 56.

Referring now to the embodiment of FIG. 6, braking assembly 70 may be configured to partially extend into or be received within a portion of driveshaft 56. Illustratively, braking assembly 70 may include an insert or support member 80 configured to support brake discs or rotors 74 while housing 72 is configured to support calipers 76. Insert 80 may be separate and distinct from housing 72 but is at least partially positioned within housing 72. As shown in FIG. 6, insert 80 is received within open volume 82 at one of the lateral ends of driveshaft 56 such that, in such an embodiment, one lateral end of driveshaft 56 does not include end cap 86. Bearings 78 may be positioned radially intermediate housing 72 and flange 84 relative to rotational axis R. In this way, at least a portion of braking assembly 70 is positioned and supported within one of the lateral ends of driveshaft 56 and within tunnel 34.

Additionally, in an illustrative embodiment, any portion of braking assembly 70 which extends into and is supported within driveshaft 56 may be supported along a lateral width of driveshaft 56 that does not radially overlap within any of lugs 66. In other words, braking assembly 70 may be positioned within tunnel 34 but is positioned laterally outward of lugs 66. In this configuration, at least a portion of braking assembly 70 of FIG. 6 may be configured to rotate with driveshaft 56.

Referring to the embodiments of FIGS. 5 and 6, a lateral width of braking assembly 70 (excluding brake fluid line 75), generally defining the lateral width of at least housing 72, is shown as width $W_1$. A lateral width of driveshaft 56 extending between opposing noses 88 is shown as width $W_2$. A lateral width of tunnel 34 extending between side walls 40 and 42 is shown as width $W_3$. As shown in the illustrative embodiments of FIGS. 5 and 6, width $W_1$ is less than width $W_2$ and width $W_3$, and width $W_2$ is less than that of width $W_3$. However, it may be appreciated that while the sum of widths $W_1$ and $W_2$ may be greater than width $W_3$ because a portion of housing 72 and driveshaft 56 laterally overlap (i.e., a portion of driveshaft 56 is received within a portion of housing 72 or vice versa), both widths $W_1$ and $W_2$ are within width $W_3$ of tunnel 34. In this way, it is apparent that both braking assembly 70 (excluding brake fluid line 75) and driveshaft 56 are positioned within tunnel 34.

Such configurations allow snowmobile 10 to maintain braking ability even if jackshaft 54 or belt/chain drive assembly 58 fails (e.g., belt 64 fails or teeth on sprockets 60, 62 are sheared) and also does not increase the width of snowmobile 10 because braking assembly 70 is positioned within tunnel 34 and does not extend into footwells or other portions of snowmobile 10 outside of tunnel 34. Additionally, by packaging braking assembly 70 within tunnel 34 and within a portion of driveshaft 56, in some embodiments, less ice accumulation may occur on housing 72 or other portions of braking assembly 70. Further, it may be appreciated that the location of braking assembly 70 of FIGS. 5 and 6 is lower than prior art braking location 69 of FIG. 3. In this way, the location of braking assembly 70 of the present application may lower the center of gravity of snowmobile 10 and increases the stability of snowmobile 10. Also, by moving braking assembly 70 within tunnel 34, additional space under body assembly 28 may be available for other systems or components. An additional advantage of the embodiments of FIGS. 5 and 6 may be that various components of powertrain assembly 30 are made lighter because such components no longer need to carry braking loads.

The embodiments of FIGS. 5 and 6 may allow for easy serviceability of driveshaft 56 and/or braking assembly 70. In particular, one of side walls 40, 42 may include a clearance opening to allow driveshaft 56 to be pulled out of tunnel 34. In various embodiments, braking assembly 70 may be disconnected from driveshaft 56 during such service or braking assembly 70 may be removed from tunnel 34 through the clearance opening, as well.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A snowmobile, comprising:
a frame assembly having a tunnel;
a powertrain assembly supported by the frame assembly; and
a braking assembly operably coupled to a drive shaft of the powertrain assembly, the braking assembly including a shielding at least partially concealing at least one of a brake disc, a brake rotor, or a brake caliper positioned within the tunnel;
wherein a portion of the shielding extends into an open volume of a lateral end of the drive shaft.

2. The snowmobile of claim 1, wherein the braking assembly is mounted on an inner surface of the tunnel.

3. The snowmobile of claim 1, wherein the braking assembly defines a first width and the drive shaft of the powertrain assembly defines a second width, and the first and second widths are generally positioned within a width of the tunnel.

4. The snowmobile of claim 1, wherein the braking assembly further includes an insert received within the open volume and positioned within the shielding.

5. The snowmobile of claim 4, wherein the shielding includes at least one brake caliper and the insert includes at least one of a brake disc or a brake rotor.

6. A snowmobile, comprising:
a frame assembly having a tunnel defined by a first side wall, a second side wall, and a support platform coupled to the first and second side walls;
a powertrain assembly supported by the frame assembly, and including a drive shaft positioned inwardly of the first and side walls; and
a braking assembly operably coupled to the drive shaft and positioned inwardly of the first and second side walls, the braking assembly including a shielding at least partially concealing a brake disc, a brake rotor, or a brake caliper, the shielding being coupled to an inner surface of one of the first and second side walls and extending into an open volume of an end of the drive shaft.

7. The snowmobile of claim 6, wherein the shielding defines a housing removably coupled to the inner surface and configured to at least partially conceal at least one of a brake disc, a brake rotor, or a brake caliper.

8. The snowmobile of claim 6, wherein the braking assembly is positioned below the support platform.

9. The snowmobile of claim 6, wherein the braking assembly further includes an insert received within the open volume and positioned within the shielding.

10. The snowmobile of claim 9, wherein the shielding includes at least one brake caliper and the insert includes at least one of a brake disc or a brake rotor.

11. A snowmobile, comprising:
a frame assembly having a tunnel defined by a first side wall, a second side wall, and a support platform coupled to the first and second side walls;
a powertrain assembly supported by the frame assembly and comprising at least a drive shaft extending between the first and second side walls; and
a braking assembly at least partially concealing a brake disc, rotor, or caliper, the braking assembly extending into a lateral end of the drive shaft and coupled to an inner surface of one of the first and second side walls.

12. The snowmobile of claim 11, wherein the braking assembly comprises a plurality of brake discs, and at least one of the plurality of brake discs is positioned within the lateral end of the drive shaft.

13. The snowmobile of claim 11, wherein the braking assembly defines a first width and the drive shaft defines a second width, and the first and second widths are generally positioned within a width of the tunnel defined as a third width.

14. The snowmobile of claim 13, wherein the first width is less than the second width and the third width, and the second width is less than the third width.

15. The snowmobile of claim 14, wherein the sum of the first and second widths is greater than the third width.

16. The snowmobile of claim 11, wherein the braking assembly further includes an insert received within an open volume of the lateral end of the drive shaft.

17. The snowmobile of claim 16, wherein the insert includes at least one of a brake disc or a brake rotor.

* * * * *